US008571929B2

(12) United States Patent
Srivastava et al.

(10) Patent No.: US 8,571,929 B2
(45) Date of Patent: *Oct. 29, 2013

(54) NON PRE-APPROVED CHANNEL FILTERING FOR CARD ACQUISITION

(75) Inventors: Atul K. Srivastava, Edison, NJ (US); Yanyan Guo, Flushing, NY (US); Michael A. Vapenik, Berkley Heights, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,782

(22) Filed: Apr. 30, 2012

(65) Prior Publication Data

US 2012/0215606 A1 Aug. 23, 2012

Related U.S. Application Data

(63) Continuation of application No. 11/676,135, filed on Feb. 16, 2007, now Pat. No. 8,190,470.

(51) Int. Cl.
*G06Q 30/00* (2012.01)
*G05B 19/418* (2006.01)

(52) U.S. Cl.
USPC ............. 705/14.17; 235/380; 705/64; 705/29

(58) Field of Classification Search
USPC ...................................... 235/380; 705/64, 29
See application file for complete search history.

(56) References Cited

U.S. PATENT DOCUMENTS

| 8,150,762 | B1* | 4/2012 | Reed ............................... 705/38 |
| 2002/0062241 | A1* | 5/2002 | Rubio et al. .................... 705/10 |
| 2004/0103065 | A1* | 5/2004 | Kishen et al. ................... 705/64 |
| 2006/0080233 | A1* | 4/2006 | Mendelovich et al. ......... 705/39 |

OTHER PUBLICATIONS

"Opting in, Opting out, or No Options at All: The Fight for Control of Personal Information", J Sovern—Washington Law Review, 1999—HeinOnline.*

"Database Marketing Practice: Protecting Consumer Privacy". Robert E. Thomas and Virginia G. Maurer. Journal of Public Policy & Marketing. vol. 16 (I). Spring 1997, pp. 147-155. This article discusses consumer credit data files available to marketers for prescreening practices to identify offerees of credit.*

(Continued)

*Primary Examiner* — Victoria Vanderhorst
(74) *Attorney, Agent, or Firm* — Snell & Wilmer L.L.P.

(57) ABSTRACT

Information can be shared across a pre-approved (PA) channel and a non pre-approved (NPA) channel to reduce unnecessary offers of a transactional instrument or transactional instrument upgrade to prospects. All prospects listed in the NPA channel that have been evaluated in the PA channel may be removed from a NPA offeree list. This may be done by matching the NPA prospect list with a list of prospects who have been evaluated in the PA channel. The list of prospects evaluated in the PA channel may include, for example, prospects who were pre-approved for an offer as well as prospects who were considered for a pre-approved offer but who were denied the offer. Prospects in the NPA channel that are removed from the NPA offer list may be dropped from further NPA processing, as such prospects are either unprofitable or do not meet a transactional account company's standards for credit.

18 Claims, 3 Drawing Sheets

(56) References Cited

OTHER PUBLICATIONS

Telemarketing endures as effective marketing strategy. Card News, v9, n6, p4(2). Apr. 4, 1994.

J Sovern: Opting in, Opting out, or No Options at All: The Fight for Control of Personal Information. Washington Law Review, 1999-HeinOnline.

http://www.businessplans.org/Segment.html.

USPTO; Office Action dated Feb. 17, 2009 in U.S. Appl. No. 11/676,135.
USPTO; Office Action dated Mar. 17, 2009 in U.S. Appl. No. 11/676,135.
USPTO; Final Office Action dated Aug. 20, 2009 in U.S. Appl. No. 11/676,135.
USPTO; Advisory Action dated Oct. 27, 2009 in U.S. Appl. No. 11/676,135.
USPTO; Notice of Allowance dated Jan. 27, 2012 in U.S. Appl. No. 11/676,135.

* cited by examiner

NON PRE-APPROVED CHANNEL FILTERING FOR CARD ACQUISITION

CROSS-REFERENCE TO RELATED APPLICATION

This continuation application claims priority to, and the benefit of, U.S. Ser. No. 11/676,135 entitled "NON PRE-APPROVED CHANNEL FILTERING FOR CARD ACQUISITION" filed on Feb. 16, 2007, which is hereby incorporated by reference in its entirety.

BACKGROUND

1. Field of the Invention

The present invention relates to providing an offer to a consumer, and more particularly, to selecting a consumer to be provided the offer.

2. Background Art

Issuers in a transactional account industry acquire new customers predominantly through two different channels: a pre-approved (PA) channel and a non pre-approved (NPA) channel. Traditionally, prospects solicited through the PA channel are removed from the NPA channel. Treating these two groups separately can reduce the marketing cost by reducing redundant, unintended solicitations. That is, if the prospect has already received a PA offer, there is no need to send the prospect a later, NPA offer. However, even this technique can still result in a significant number of unnecessary offers.

What is needed is a system and method for further reducing the numbers of unnecessary transactional instrument offers to prospects.

BRIEF SUMMARY

Information can be shared across a PA channel and a NPA channel to reduce unnecessary offers to prospects. All prospects listed in the NPA channel that have been evaluated in the PA channel may be removed from a NPA offeree list. This may he done by matching the NPA prospect list with a list of prospects who have been evaluated in the PA channel. The list of prospects who have been evaluated in the PA channel may include, for example, prospects who were pre-approved for an offer as well as prospects who were considered for a pre-approved offer but who were denied the offer. Prospects in the NPA channel that are removed from the NPA offer list may be dropped from further NPA processing, as such prospects are either unprofitable or do not meet a transactional account company's standards for credit.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

I. Overview

Figure 1:
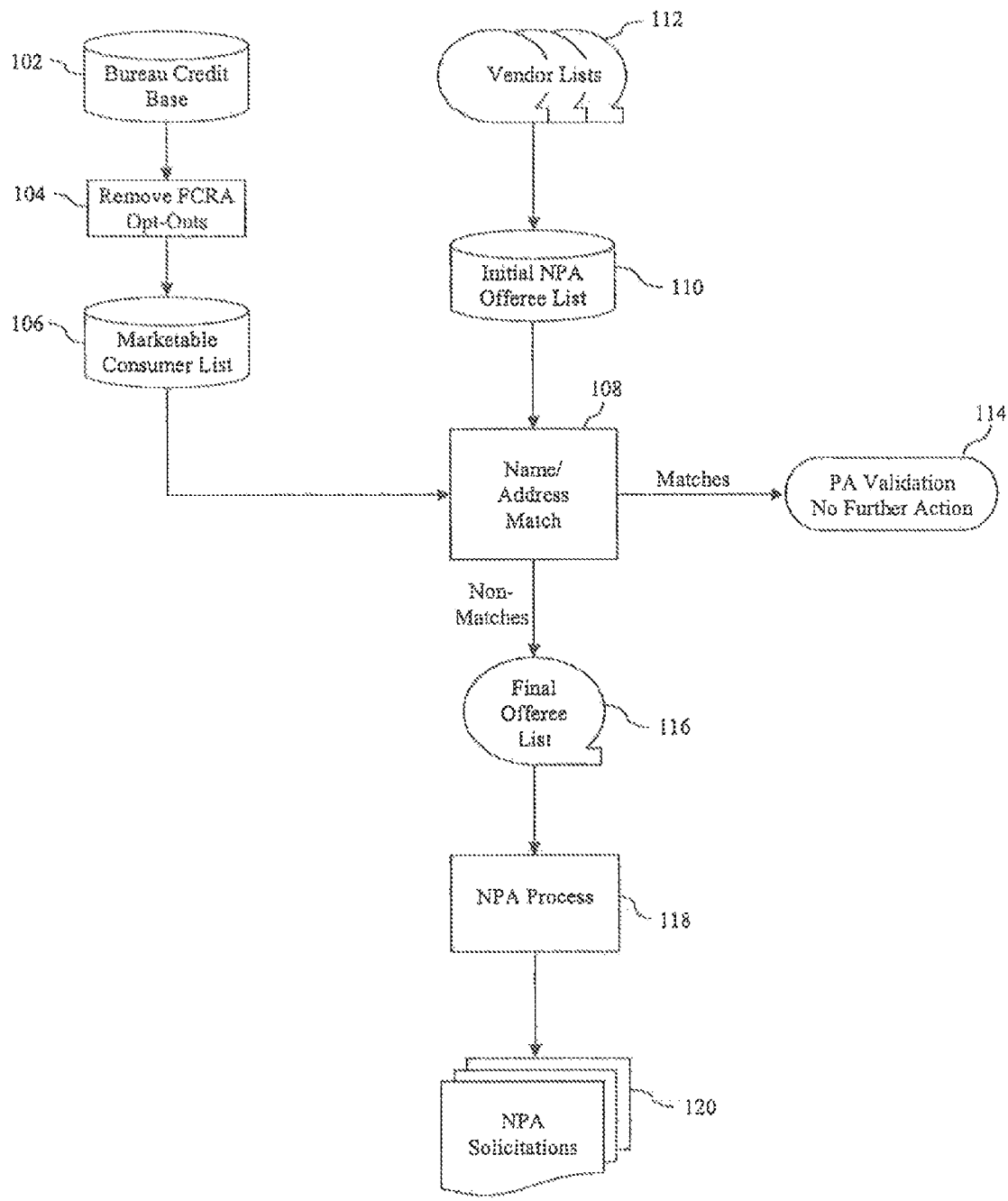
FIG. 1 is a diagram of an exemplary method of and system for generating a NPA contact list according to an embodiment of the present invention.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "prospect," "consumer," "customer," and/or the plural form of these terms may be used interchangeably throughout herein to refer to those persons or entities capable of accessing, using, being affected by and/or benefiting from the tool that the present invention provides for generating a contact list for non pre-approved offerees.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants, Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. NPA Filtering

Transactional account companies invite prospects to open a new account with the transactional account company primarily through two different channels: a pre-approved (PA) offer channel and a non pre-approved (NPA) offer channel. A PA offer, as the term is used herein, refers to an offer for a new transactional instrument or an upgrade to an existing transactional instrument that is sent to a prospect who has been evaluated according to at least one criteria set out by the transactional account company. Qualifications such as creditworthiness and profitability (e.g., whether a prospect fails to pay their bills each month, whether the prospect is revolving and carries over debt earning a transactional account company interest, etc.) are considered when evaluating a prospect in the PA channel. Because the PA prospect has already been evaluated, a response to a PA offer is typically accepted by the transactional account company.

A NPA offer, as the term is used herein, refers to an offer for a new transactional instrument or an upgrade to an existing transactional instrument that is sent to a prospect with little or no evaluation of the prospect's credit history. Because the NPA prospect has not yet been evaluated, there is no guarantee that a response to the NPA offer will be approved.

Once a PA prospect has been contacted, the PA prospect may be removed from a list of prospects in the NPA channel. This is because the PA prospect has already been contacted with an offer and it would be redundant to market a NPA offer to the PA prospect. Redundant marketing increases costs of the transactional account company, and may result in confusion and/or annoyance to the PA prospect.

Prospects who are not approved (and thus denied) during the PA process are typically not contacted with PA offers. Traditionally, these prospects would be put back into the pool of prospects who may be considered for a NPA offer. However, according to an embodiment of the present invention, prospects who are not approved during the PA process are also removed from the NPA process. As the prospect has already been found to fail the approval criteria used in the PA channel, it may be assumed that the prospect would also fail the same or similar approval criteria used to evaluate NPA applications, and that there is no need to send an offer to such a prospect.

FIG. 1 is a diagram of an exemplary method of and system for generating a contact list according to an embodiment of the present invention. Information about potential prospects is obtained from bureau credit base 102. Bureau credit base 102 may be, for example, a database of individuals and/or businesses having credit bureau history. Bureau credit base 102 may be maintained by, for example, Experian information Solutions of Costa Mesa, Calif. Prospects may be added to bureau credit base 102 by, for example and without limitation, opening a transactional account, applying for a loan, etc.

At 104, individuals who have opted out of credit evaluations under the Federal Credit Reporting Act (FCRA) are removed from bureau credit base 102 to produce marketable consumers list 106. Marketable consumers list 106 includes all individuals having credit bureau history who have not opted-out of credit evaluations under the FCRA. In a first embodiment, marketable consumers list 106 is provided to the transactional account company. In a second embodiment, marketable consumers list 106 is provided to a third party acting as a proxy for the transactional account company. The third party may be a data collection company such as, for example, Acxiom Corporation of Little Rock, Ark. Marketable consumers list 106 includes all prospects that have been processed through the PA channel.

Figure 2:
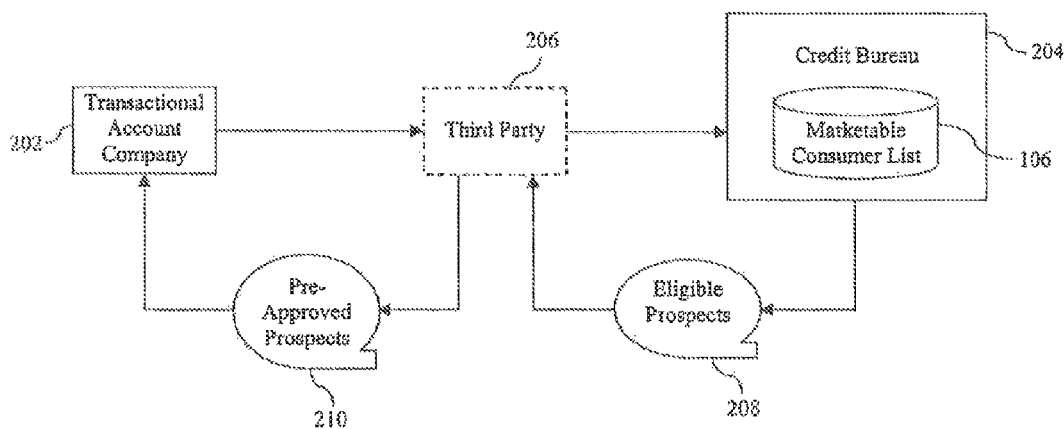
FIG. 2 is a diagram of an exemplary method of and system for generating a PA contact list according to an embodiment of the present invention.

To further clarify, an exemplary method of and system for processing prospects through the PA channel is illustrated in FIG. 2. A transactional account company 202 provides at least one criteria to a credit bureau 204. In an embodiment, the criteria is provided directly to credit bureau 204. In another embodiment, the criteria is provided through a third party 206, such as Acxiom Corporation.

Credit bureau 204 then filters through its database of prospects who have not opted out of credit evaluations (such as marketable consumers list 106 of FIG. 1) and returns a list of eligible prospects 208 who meet the provided criteria. Such criteria may include, for example and without limitation, a minimum FICO (Fair Issac Corporation) score (produced by Fair Isaac Corporation of Minneapolis, Minn.) or a minimum number of months since the prospect filed for bankruptcy. Prospects who meet the criteria and who are included in list of eligible prospects 208 may be considered "credit qualified."

In an embodiment, transactional account company 202 or third party 206 may accept list of eligible prospects 208 as the prospects who should receive a PA offer. In another embodiment, transactional account company 202 or third party 206 may perform an additional filter on list of eligible prospects 208 to produce a list of PA prospects 210. The additional filter may include, for example and without limitation, whether the prospect is enough of as revolver (e.g., the prospect carries over debt each month, earning the transactional account company interest) to be profitable to transactional account company 202. Although a prospect may be "credit qualified," the prospect may also be considered "unprofitable." Prospects determined to be unprofitable, for example, are denied as PA offer and removed from list of PA prospects 210. List of PA prospects 210 thus includes only those prospects who qualify for a PA offer.

If the filter was performed by third party 206, list of PA prospects 210 is provided to transactional account company 202.

Once transactional account company 202 has received list of PA prospects 210, transactional account company 202 may market PA offers to prospects on list of PA prospects 210.

As can be seen from FIG. 2, all prospects listed in marketable consumers list 106 are evaluated during the PA process. Some prospects may fail the initial filter as they are not credit-worthy; other prospects may fail the second filter as they are not profitable. These prospects are denied a PA offer. Therefore, there is no reason to later send them a NPA offer, as an application in response to such an offer would ultimately be rejected for the same or a similar reason the prospect was denied the PA offer. Additionally, making NPA offers to prospects who received a PA offer is redundant.

For this reason, any prospect evaluated during the PA process of FIG. 2 does not need to be reevaluated during the NPA process of FIG. 1.

Returning to FIG. 1, at 108 the list of prospects in marketable consumers list 106 is compared to (matched with) an initial NPA offeree list 110. Initial NPA offeree list 110 is a compilation of names, addresses, and/or other attributes from one or more vendor lists 112. Vendor lists 112 are obtained from various vendors and/or publicly available sources. For example, vendor lists 112 may be obtained, in whole or in part, from the InfoBase® database maintained by Acxiom Corporation. InfoBase® is a database of United States consumer and telephone data. One of skill in the art will recognize that other types of databases from other sources may also be included in vendor lists 112 and used to populate initial NPA offeree list 110. Because initial NPA offeree list 110 is not tied only to credit bureau information, prospects in initial NPA offeree list 110 are not necessarily included in bureau credit base 102 or marketable consumers list 106. Initial NPA offeree list 110 may include consumers who have credit bureau history, consumers who have no credit bureau history, and consumers who have opted out of credit bureau reporting under the FCRA. Initial NPA offeree list 110 may be maintained in a database, for example, by the transactional account company (such as transactional account company 202 of FIG. 2) or a third party such as third party 206 of FIG. 2).

During comparing (matching) 108, prospects in initial NPA offeree list 110 who are matched with prospects in marketable consumers list 106 are flagged as PA validated prospects 114. PA validated prospects 114 may be matched based on, for example and without limitation, name and/or address. PA validated prospects 114 are removed from initial NPA offeree list 110, and no further action is taken with respect to PA validated prospects 114.

The remainder of prospects in initial NPA offeree list 110, who did not match prospects in marketable consumers list 106, are placed in a final offeree list 116. Final offeree list 116 therefore includes, for example and without limitation, those prospects who have opted out of credit evaluations by the credit bureau under the FCRA, as well as those prospects who do not have any credit history and were thus not identified by the credit bureau. Prospects who do not have any credit history include, for example and without limitation, individuals who have recently turned 18 and individuals who have recently moved into the country.

At 118, prospects in final offeree list 116 are processed through a standard NPA process. A standard NPA process is well known to those of skill in the pertinent art, and is thus not further described herein. As a result of process 118, NPA solicitations 120 are sent to the prospects included in final offeree list 116.

In this manner as shown in FIG. 1, NPA offers may be sent only to those individuals who were not previously evaluated by the transactional account company for PA offers. This reduces redundant and/or unnecessary offers that would otherwise result from sending NPA offers to PA offerees, as well as from sending NPA offers to non credit-worthy and/or non-profitable prospects.

III. Example Implementations

The embodiments as described in FIGS. 1 and 2, or any part(s) or function(s) thereof, may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
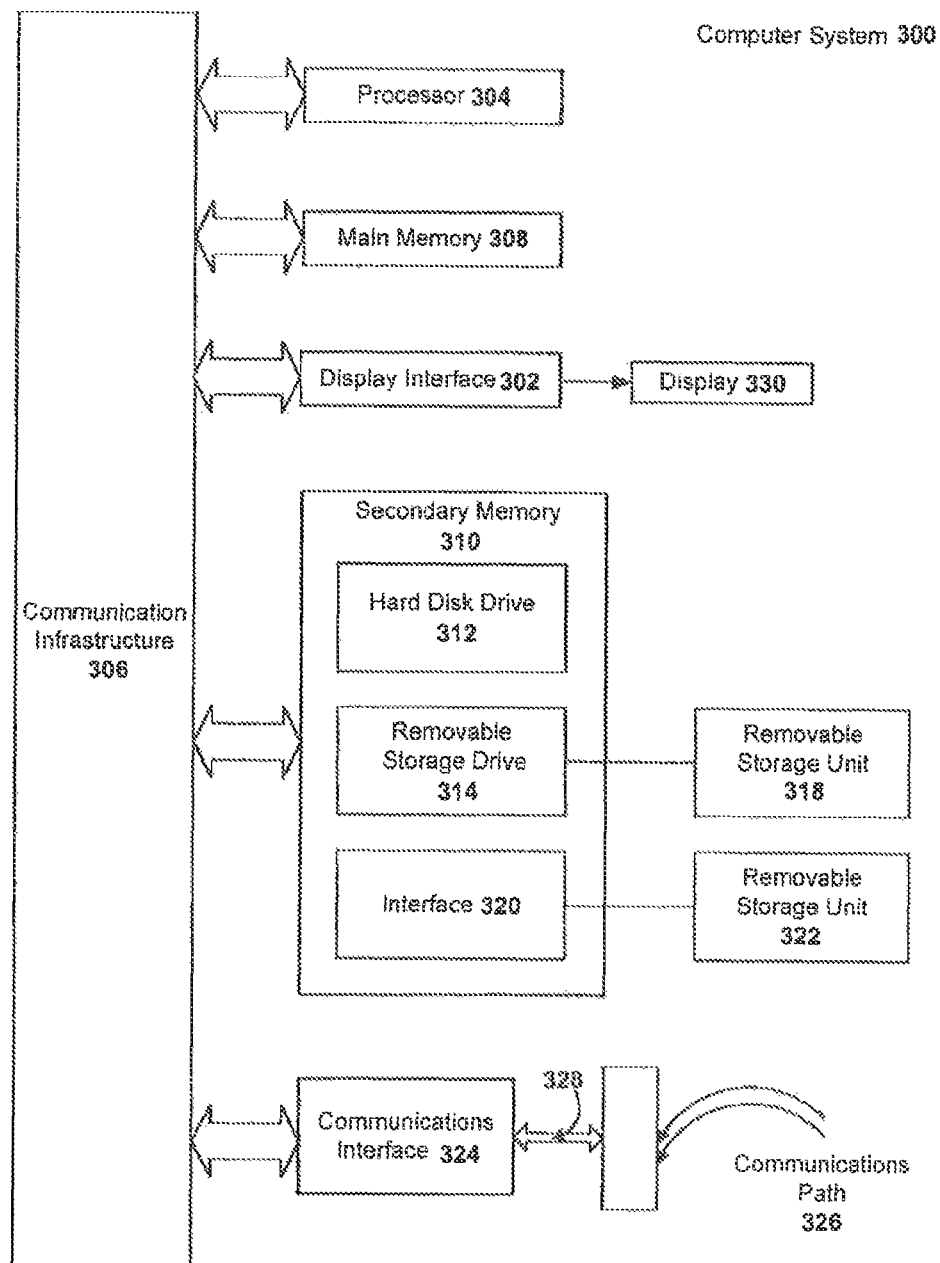
FIG. 3 is a block diagram of an exemplary computer system useful for implementing the present invention.

In fact, in one embodiment, the invention is directed toward one or more computer systems capable of carrying out the functionality described herein. An example of a computer system 300 is shown in FIG. 3.

The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 314 and a hard disk installed in hard disk drive 312. These computer program products provide software to computer system 300. The invention may be directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    associating, by a computer based system for generating a contact list, consumer information on a first offeree list with consumer information on a marketable consumers list to obtain a matched consumer, wherein the marketable consumers list identifies consumer information that has been processed through a pre-approval process and an indication that a consumer associated with the consumer information on the marketable consumers list was previously denied a pre-approved offer; and
    removing, by the computer based system, the matched consumer from the first offeree list to produce a second offeree list.

2. The method of claim 1, wherein the marketable consumers list includes the consumer information for consumers who were previously denied a pre-approved offer by not meeting first credit criteria specified by an offeror.

3. The method of claim 1, wherein the marketable consumers list includes the consumer information for consumers who were previously denied a pre-approved offer by meeting first credit criteria specified by an offeror, but who were not extended an offer for credit.

4. The method of claim 1, further comprising generating a first offeree list by identifying consumers having credit history, consumers having no credit history, and consumers who have opted out of credit bureau reporting.

5. The method of claim 1, wherein the marketable consumers list contains consumers having credit bureau history, but excludes consumers who have opted out of sharing their information.

6. The method of claim 1, wherein the associating comprises matching a consumer name on the first offeree list with a consumer name on the marketable consumers list.

7. The method of claim 1, wherein the associating comprises matching a consumer address on the first offeree list with a consumer address on the marketable consumers list.

8. The method of claim 1, wherein the removing comprises removing consumers from the first offeree list, except consumers having no credit history and consumers who have opted out of credit bureau reporting.

9. The method of claim 1, further comprising transmitting a non-pre-approved offer to each consumer on the second offeree list.

10. A system comprising:
a processor generating a contact list,
a tangible, non-transitory memory configured to communicate with the processor, the tangible, non-transitory memory having instructions stored thereon that, in response to execution by the processor, cause the processor to be capable of performing operations comprising:
  associating, by the processor, consumer information on a first offeree list with consumer information on a marketable consumers list to obtain a matched consumer, wherein the marketable consumers list identifies consumer information that has been processed through a pre-approval process and an indication that a consumer associated with the consumer information on the marketable consumers list was previously denied a pre-approved offer; and
  removing, by the processor, the matched consumer from the first offeree list to produce a second offeree list.

11. The system of claim 10, wherein the marketable consumers list includes the consumer information for consumers who were previously denied a pre-approved offer by not meeting first credit criteria specified by an offeror.

12. The system of claim 10, wherein the marketable consumers list includes the consumer information for consumers who were previously denied a pre-approved offer by meeting first credit criteria specified by an offeror, but who were not extended an offer for credit.

13. The system of claim 10, further comprising generating a first offeree list by identifying consumers having credit history, consumers having no credit history, and consumers who have opted out of credit bureau reporting.

14. The system of claim 10, wherein the marketable consumers list contains consumers having credit bureau history, but excludes consumers who have opted out of sharing their information.

15. The system of claim 10, wherein the associating comprises at least one of matching a consumer name on the first offeree list with a consumer name on the marketable consumers list and matching a consumer address on the first offeree list with a consumer address on the marketable consumers list.

16. The system of claim 10, wherein the removing comprises removing consumers from the first offeree list, except consumers having no credit history and consumers who have opted out of credit bureau reporting.

17. The system of claim 10, further comprising transmitting a non-pre-approved offer to each consumer on the second offeree list.

18. An article of manufacture including a non-transitory, tangible computer readable storage medium having instructions stored thereon that, in response to execution by a computer-based system for generating a contact list, cause the computer-based system to be capable of performing operations comprising:
  associating, by the computer based system, consumer information on a first offeree list with consumer information on a marketable consumers list to obtain a matched consumer, wherein the marketable consumers list identifies consumer information that has been processed through a pre-approval process and an indication that a consumer associated with the consumer information on the marketable consumers list was previously denied a pre-approved offer; and
  removing, by the computer based system, the matched consumer from the first offeree list to produce a second offeree list.

* * * * *